June 18, 1968    H. E. TRACY    3,388,913
MECHANICAL SEAL

Filed June 3, 1965    2 Sheets-Sheet 1

HERBERT E. TRACY
INVENTOR.

BY John O. Evans, Jr.

ATTORNEY

June 18, 1968  H. E. TRACY  3,388,913
MECHANICAL SEAL

Filed June 3, 1965  2 Sheets-Sheet 2

HERBERT E. TRACY
INVENTOR.

BY John O. Evans, Jr.

ATTORNEY

United States Patent Office 3,388,913
Patented June 18, 1968

3,388,913
MECHANICAL SEAL
Herbert E. Tracy, Alhambra, Calif., assignor to Borg-Warner Corporation, Chicago, Ill., a corporation of Illinois
Filed June 3, 1965, Ser. No. 460,899
3 Claims. (Cl. 277—32)

ABSTRACT OF THE DISCLOSURE

A mechanical seal assembly having a stationary sealing ring carried by a flange and a complementary rotary sealing ring mounted on a shaft. The assembly may be reversed to serve as either an inside seal or an outside seal. Preferably the rotary sealing ring is supported by a bellows having an adapter ring that is locked to the shaft by a set screw which exerts locking pressure on the shaft through a split ring.

---

This invention relates to mechanical seals. More particularly, the invention relates to a mechanical seal which may be easily adapted to installation, either inside of or outside of a stuffing box. Also, the invention concerns an arrangement for securing to a shaft a rotating sealing member of a mechanical seal.

A mechanical seal is used to seal a rotary shaft to a housing through which the shaft extends. Such a seal includes a fixed sealing ring that is sealed to the housing and a complementary rotary ring that is sealed to the shaft. These sealing rings have abutting, lapped, sealing surfaces. One of the rings is movable longitudinally of the shaft and is pressed into sealing engagement with the other of the rings by a spring or other biasing means. Such other ring is conventionally not movable along the shaft. The lapped sealing surfaces of the rings rotate relative to each other and effectively seal the rotating shaft against the flow of fluid from the interior of the housing outwardly of the housing along the shaft. Due to pressure drop across the sealing faces, fluid flows at a low rate between them and thus lubricates the sealing surfaces.

According to one arbitrarily defined classification, mechanical seals may be termed inside seals or outside seals, depending upon whether the mechanical seal is installed inside of or outside of a stuffing box which forms a portion of a housing. With this definition in mind, it is a principal object of the invention to provide a mechanical seal assembly that may be easily and quickly installed either as an inside seal or an outside seal.

Another object of the invention is to provide a mechanical seal assembly consisting of two simple subassemblies, namely, a stationary subassembly and a rotating subassembly.

Yet another object is to provide a mechanical seal assembly that is adapted for use as an inside seal, and that may be easily and simply altered for use as an outside seal on a stuffing box that is too small to accommodate the mechanical seal assembly inside of the stuffing box.

Mechanical seal devices must have some means for securing the rotary sealing member to the shaft. Such means may take the form of one or more set screws that fix the rotary parts to the shaft. In some instances, the shaft may be relatively soft, or it may be hard but coated with a soft material such as a synthetic resin. If set screws are pressed against such a shaft, damage to the shaft or coating may occur. Therefore, it is a further object of the invention to provide, in a mechanical seal device, an arrangement whereby the shaft will not be damaged by set screws or the like that are used to secure the rotary sealing member to the shaft.

Another object of the invention is to provide a mechanical seal in which the sealing ring assembly is so balanced that it will be effective to seal the shaft regardless of whether the assembly is installed as an inside seal or an outside seal.

Further, it is an object of the invention to provide a mechanical seal wherein the axially movable sealing element is not preloaded into sealing engagement with the axially fixed sealing element by separate spring means.

In one of its aspects, the present invention is embodied in a mechanical seal including a flange, a sealing ring mounted on the flange, a complementary sealing ring, and means for mounting the complementary sealing ring on a shaft. The flange has sealing elements, one on each side, for selectively cooperating with complementary sealing elements on a housing. The sealing rings are adapted to seal against a pressure differential in either direction thereacross.

In another aspect, the invention is embodied in a mechanical seal including rotary sealing ring means adapted to encircle a shaft, a split ring adapted to encircle the shaft, and means for releasably locking the sealing ring means to the shaft, the locking means including means carried by the sealing ring means for exerting locking pressure on the shaft through the split ring. The means for releasably securing the sealing ring means to the shaft may be one or more set screws carried by the sealing ring means.

The invention will be described in greater detail, and other of its aims, objects, and advantages, will be pointed out in the following detailed description taken in connection with the accompanying drawings, in which.

Figure 1:
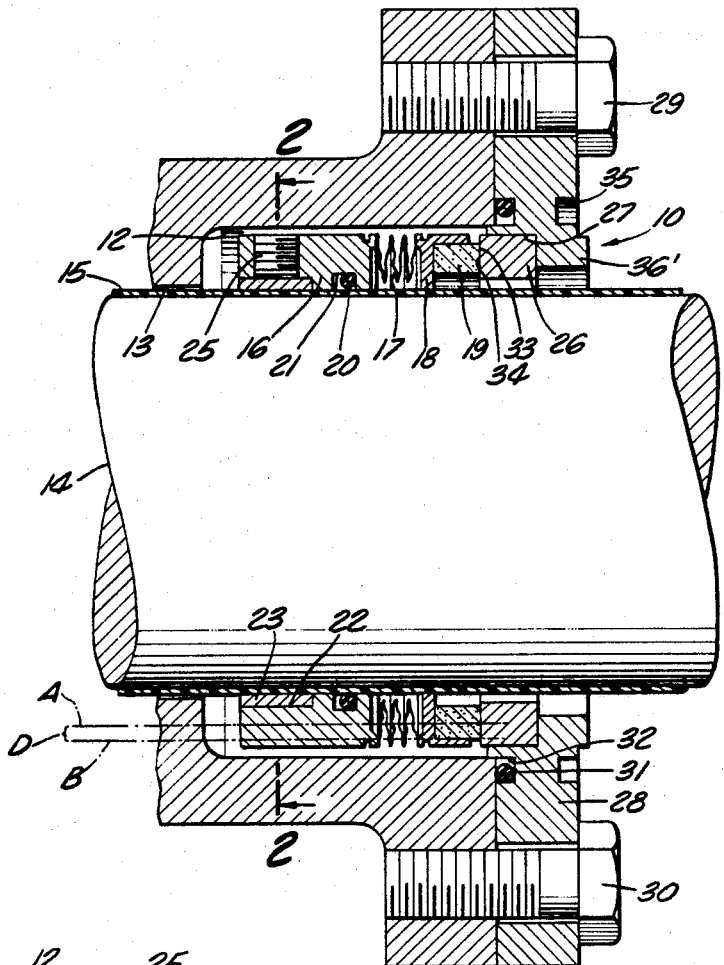
FIG. 1 is an axial sectional view of an exemplary mechanical seal in accordance with the invention showing the sealing rings installed inside of a stuffing box.
Figure 2:
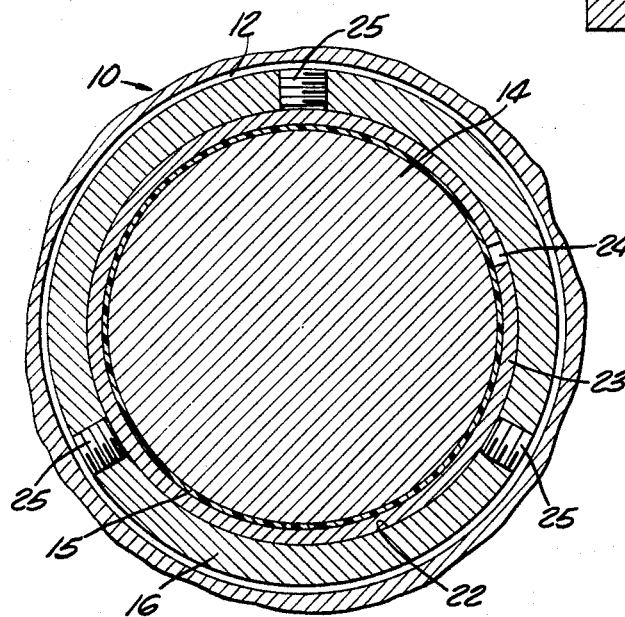
FIG. 2 is a sectional view taken on the line 2—2 of FIG. 1 looking in the direction of the arrows.

Referring to the drawings, particularly to FIGS. 1 and 2, the mechanical seal assembly shown is designated by the general reference numeral 10. This assembly is mounted upon a housing 11 having a stuffing box 12. The stuffing box communicates with the interior of the housing through a shaft opening 13. A shaft 14 extends through the stuffing box and through the shaft opening and is spaced therefrom. The housing, which confines fluid under high pressure, may be a pump housing, for example. A pump impeller (not shown) may be carried by the left-hand end of the shaft 14, as seen in FIG. 1. The right-hand end of the shaft may be connected to a driver, such as an electric motor. The shaft is journaled as is conventional in suitable bearings (not shown).

The shaft 14 may be exposed to fluid in the housing that would corrode the shaft. In order to protect the shaft against corrosion, it may be coated with a coating 15 of plastic material. This coating is fragile and is easily marred or gouged.

A rotary sealing ring means is secured to the shaft for rotation therewith, the rotary sealing ring means being positioned within the stuffing box 12. The rotary sealing means includes a bellows adapter 16. Welded to one end of the adapter is a metal bellows 17. The bellows has welded to it a bellows flange 18. This flange carries a rotary sealing ring 19. For the purpose of sealing the adapter to the shaft, an O-ring 20 is positioned between the adapter and the shaft in an O-ring groove 21. The welded joints between the bellows 17 and the adapter and between the bellows and the bellows flange 18 are hermetic. The rotary sealing ring 19 is press-fitted into the flange 18 and provides a fluid-tight joint between these members.

In the inner periphery of the adapter, there is formed a circumferential groove 22. A split ring 23 is positioned in this groove between the adapter and the shaft. The ring may be made of metal and has a gap 24 between the ends of the ring. Set screws 25, conveniently three in number, are threaded into the adapter and positioned to be driven against the outer periphery of the split ring 23. These set screws may be equally spaced about the circumference of the adapter.

To lock the adapter and its associated parts to the shaft, the set screws 25 are forcibly turned in against the split ring 23. The locking forces exerted by these set screws are applied directly to the split ring and, through the split ring, are applied to the shaft over areas much greater than the cross-sectional areas of the screws. Thus, the set screws do not dig into the surface of the shaft to mar or damage it. It will be understood that if it is desired to protect the surface of the shaft or the coating on the shaft from set screw damage, the split ring 23 will be employed. However, where shaft damage is of no consequence, the split ring may be omitted. It will also be understood that if it is not necessary to protect the shaft from corrosion, the plastic coating 15 may be dispensed with.

A stationary sealing ring 26 is press-fitted into a recess 27 in the stuffing box flange 28. The finish of the parts and the closeness of their interengagement forms a static seal between the ring and the flange. Bolts 29 and 30 fasten the flange to the housing 11. An O-ring gasket or packing 31, received in an annular O-ring groove 32, seals the flange to the housing. The joint between the stationary ring 26 and the recess 27 of the flange is made fluid-tight against the pressures encountered. Thus, leakage of fluid from the stuffing box between the stationary sealing ring and the flange is prevented.

The complementary sealing rings 19 and 26 may be made of a variety of materials. By way of example, the rotary sealing ring may be made of carbon and the stationary sealing ring may be made of Stellite or other hard material. Other combinations, such as a carbon or bronze ring opposed to a ceramic, tungsten carbide, or steel ring, may be employed.

The rotary ring 19 has a sealing surface 33 opposed to the sealing surface 34 of the stationary ring. These sealing surfaces are lapped to a substantially planar and highly polished condition. In operation, fluid from the stuffing box 12 flows at a low rate between the complementary sealing surfaces of the sealing rings to lubricate and cool these rings.

From FIG. 1, it will be seen that the stuffing box flange 28 has another annular O-ring groove 35 opposite the O-ring groove 32. The purpose of the two O-ring grooves will be set forth more fully hereinafter.

When the seal is installed, as in FIG. 1, the bellows 17 is under axial compression. Thus, an initial force or preload is imposed upon the rotary sealing ring 19 to press it into contact with the stationary sealing ring 26. Additional force tending to press the sealing rings together is applied by the elevated pressure fluid in the stuffing box 12. When the shaft is rotated, the rotary sealing ring rubs against the stationary sealing ring. The fluid pressure inside the stuffing box causes a thin film of fluid to flow outwardly between the sealing surfaces 33 and 34, and thence along the shaft to the exterior of the flange.

Installation of the mechanical seal assembly of the invention as an outside seal will now be described with reference to FIG. 3. Parts shown in FIG. 3 that are the same as or similar to parts shown in FIGS. 1 and 2 are designated by corresponding primed reference numerals.

Figure 3:
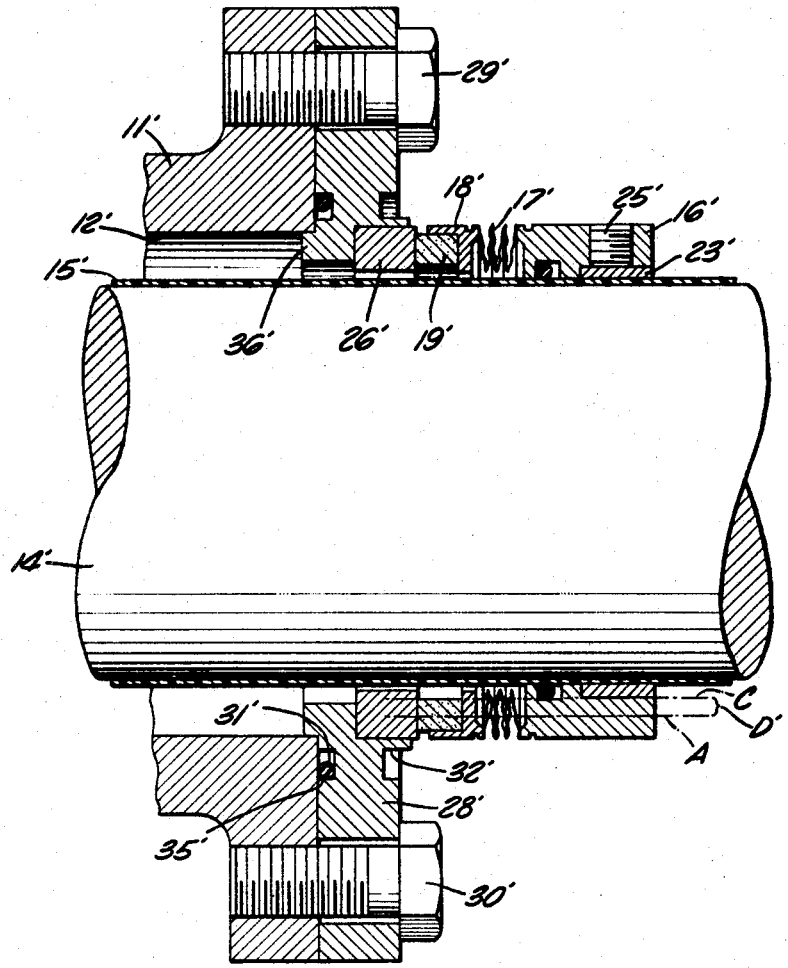
FIG. 3 is an axial sectional view of the mechanical seal device of FIG. 1, slightly altered, showing the sealing elements installed outside the stuffing box.

In the assembly of FIG. 3, the housing 11' is similar to the housing 11 of FIG. 1. However the stuffing box 12' has a smaller inside diameter than the stuffing box 12. The stuffing box 12' is too narrow to accommodate the sealing elements of the mechanical seal. Hence, the seal must be installed outside of the stuffing box. To accomplish this, the centering sleeve of the flange 28 of FIG. 1 is turned down to form a flange 36' of reduced diameter which is fitted snugly into the end of the stuffing box 12'. An O-ring gasket or packing 31' is inserted into the flange O-ring groove 35' to prevent passage of liquid between the flange and the housing. In the installation of FIG. 3, the stationary sealing ring 26' is located outside the stuffing box 12'. The cooperating rotary sealing ring 19' is carried by the bellows flange 18', which in turn is mounted on the bellows 17'. The latter is supported by the bellows adapter 16' that is locked to the shaft by the set screws 25'. These set screws act through the split ring 23' to lock the bellows adapter to the shaft 14'.

From the foregoing description, it is seen that the seal assembly of the present invention can be used selectively either as an inside seal or as an outside seal by simply reversing the parts.

As mentioned hereinbefore, the mechanical seal of the present invention is so balanced that it will seal effectively whether used as an inside seal or as an outside seal. The balancing of the seal for this purpose is explained as follows. In FIGS. 1 and 3, the construction line A denotes an imaginary cylinder concentric with the axis of the seal and passing through the bellows to divide the bellows into two adjacent annular portions. The radially inward annular portion has a cross-sectional area equal to that of the radially outward annular portion. The construction line B of FIG. 1 represents a cylinder concentric with the axis of the seal elements and intersecting the outer edge of the sealing interface between the rotary sealing ring 19 and the stationary sealing ring 26. The cylinders A and B delimit an annular area D upon which the fluid inside the stuffing box of FIG. 1 acts in a direction to force the sealing rings into engagement. This force is equal to the pressure of the fluid inside the stuffing box minus the pressure of the fluid outside the stuffing box multiplied by the annular area D.

In the arrangement of FIG. 3, the construction line C represents a cylinder concentric with the axis of the seal and intersecting the inner edge of the sealing interface between the rotary sealing ring 19 and stationary sealing ring 26. The construction lines A and C in FIG. 3 define an annular area D' upon which the pressure of fluid inside of the stuffing box acts to force the rotary sealing ring into engagement with the stationary sealing ring. The magnitude of this force may be readily calculated.

If the area D of FIG. 1 is equal to the area D' of FIG. 3, and if the differential fluid pressure across the bellows is the same in both cases, the forces tending to press the rotary sealing rings into engagement with the stationary sealing rings are equal. These forces can be made unequal by selecting the inside and outside diameters of the rotary sealing ring, and the diameter of the imaginary cylinder A, such that the desired sizes of the annular areas D and D' are different.

From the foregoing description it will be seen that the present invention provides a mechanical seal assembly that realizes in a highly satisfactory manner the objects and advantages of the invention.

From a study of the foregoing description, various modifications of the invention will occur to those skilled in the art. Therefore, the invention is not to be limited to the particular embodiments shown and described, but is to be construed as broadly as the prior art permits.

I claim:

1. A mechanical seal for sealing a shaft to a housing having a stuffing box through which the shaft extends comprising:

(a) a flange providing a shaft opening therethrough;

(b) a sealing ring mounted on said flange about said opening;

(c) means for statically sealing said ring to said flange;
(d) a complementary sealing ring;
(e) means for mounting said complementary sealing ring on the shaft;
(f) means for sealing the complementary sealing ring to the shaft;
(g) centering collars, one on each side of said flange adapted to fit in the stuffing box of the housing for centering said flange with respect to the stuffing box;
(h) said flange having O-ring grooves, one on each side surrounding one of said collars and adapted to receive an O-ring for selectively cooperating with a complementary sealing element on the housing for sealing said flange to the housing; and
(i) said sealing rings being adapted to seal against a pressure differential in either direction thereacross.

2. A mechanical seal assembly for sealing a rotatable shaft to a housing having a shaft opening through which the shaft extends, said assembly comprising:
(a) a relatively stationary subassembly including:
   (i) a flange encircling the shaft and having a first face abutting the housing and a second face on the opposite side of said flange,
   (ii) a stationary sealing ring surrounding the shaft and spaced radially from it, said sealing ring having a radially disposed sealing surface facing inwardly of the shaft opening,
   (iii) means for sealingly mounting said stationary sealing ring on said flange, and
   (iv) said relatively stationary subassembly being reversible to bring said second face of said flange into abutment with the housing;
(b) a rotary sealing ring having a radially disposed sealing surface adapted to sealingly coact with the sealing surface of said stationary sealing ring;
(c) means for releasably securing said rotary sealing ring to the shaft with its sealing surface in relatively rotatable sealing relation with the sealing surface of said stationary sealing ring;
(d) said rotary sealing ring and said means for securing it to the shaft being reversible on the shaft to place said rotary sealing ring in relatively rotatable sealing relation with said stationary sealing ring when said relatively stationary subassembly is reversed;
(e) means for fastening said relatively stationary subassembly to the housing with one of the faces of said flange abutting the housing;
(f) packing means disposed between the housing and the abutting flange face; and
(g) said sealing rings being constructed and arranged to seal against a fluid pressure differential in either direction thereacross.

3. A mechanical seal assembly as defined in claim 2 wherein said packing means is an O-ring gasket and said flange provides O-ring grooves in said first and second faces for receiving said gasket.

References Cited

UNITED STATES PATENTS

| | | | |
|---|---|---|---|
| 2,479,265 | 8/1949 | Roshong | 277—89 X |
| 2,508,097 | 5/1950 | Brown | 277—89 X |
| 2,559,963 | 7/1951 | Jensen | 277—89 X |
| 2,740,648 | 4/1956 | Amblard | 277—89 |
| 2,887,330 | 5/1959 | Cobb | 277—32 |
| 3,147,013 | 9/1964 | Tracy | 277—88 X |
| 3,181,874 | 5/1965 | Conklin | 277—93 X |
| 3,191,945 | 6/1965 | Andresen | 277—88 X |
| 2,247,505 | 7/1941 | Kohler | 277—81 X |

SAMUEL ROTHBERG, *Primary Examiner.*